(12) United States Patent
Austin et al.

(10) Patent No.: US 12,412,181 B2
(45) Date of Patent: Sep. 9, 2025

(54) TESTING OF TEMPLATES OF ELECTRONIC MESSAGES

(71) Applicant: Klaviyo, Inc., Boston, MA (US)

(72) Inventors: Woody T. Austin, Seattle, WA (US); Nicholas Hartmann, Swampscott, MA (US); Carola Leiva, Boston, MA (US); Justin Xu, Boston, MA (US); Mohammad Suffian Bin Hamzah, Brookline, MA (US); Xuemeng Sun, Perris, CA (US); Nikhil Bhaip, Medford, MA (US); Thomas Culp, Cambridge, MA (US)

(73) Assignee: Klaviyo, Inc, Boston, MA (US)

( * ) Notice: Subject to any disclaimer, the term of this patent is extended or adjusted under 35 U.S.C. 154(b) by 353 days.

(21) Appl. No.: 18/111,573

(22) Filed: Feb. 19, 2023

(65) Prior Publication Data

US 2024/0281822 A1     Aug. 22, 2024

(51) Int. Cl.
G06Q 30/00    (2023.01)
G06Q 30/015   (2023.01)
G06Q 10/107   (2023.01)

(52) U.S. Cl.
CPC ......... G06Q 30/015 (2023.01); *G06Q 10/107* (2013.01)

(58) Field of Classification Search
None
See application file for complete search history.

(56) References Cited

U.S. PATENT DOCUMENTS

| | | |
|---|---|---|
| 6,519,571 B1 | 2/2003 | Guheen et al. |
| 7,130,808 B1 | 10/2006 | Ranka et al. |
| 7,533,090 B2 | 5/2009 | Agarwal et al. |
| 7,752,607 B2 | 7/2010 | Larab et al. |
| 7,845,950 B2 | 12/2010 | Driscoll et al. |
| 7,975,000 B2 | 7/2011 | Dixon et al. |
| 10,438,230 B2 | 10/2019 | Moran et al. |
| 10,503,912 B1 | 12/2019 | Kerr |
| 2006/0162071 A1 | 7/2006 | Dixon et al. |

(Continued)

OTHER PUBLICATIONS

Connected Services: A Guide to the Internet Technologies Shaping the Future of Mobile Services and Operators, Paul Golding, Copyright Year: 2011. (Year: 2011).*

(Continued)

*Primary Examiner* — Matthew T Sittner
(74) *Attorney, Agent, or Firm* — Brian R. Short

(57) ABSTRACT

Apparatuses, methods, and systems for testing templates of electronic messages. One method includes continuously sending, by a server, a main electronic message, wherein at least a content of the main electronic message is determined by a main message template, creating a plurality of test templates including at least an A template and a B template, initiating, by the server, testing of test electronic messages, wherein at least a content of one test electronic message is determined by the A template, and at least the content of another of the test electronic message is determined by the B template, wherein editing of the test electronic messages occurs simultaneous with the continuous sending of the main electronic message, and selecting, by the server, a winning template of the A template and the B template.

18 Claims, 14 Drawing Sheets

(56) References Cited

U.S. PATENT DOCUMENTS

| | | | |
|---|---|---|---|
| 2007/0100805 A1 | 5/2007 | Ramer et al. | |
| 2008/0189156 A1 | 8/2008 | Voda et al. | |
| 2009/0089131 A1* | 4/2009 | Moukas | G06Q 30/0267 |
| | | | 705/70 |
| 2011/0270710 A1* | 11/2011 | Nash | G06Q 30/0641 |
| | | | 709/206 |
| 2011/0307331 A1 | 12/2011 | Richard et al. | |
| 2012/0191546 A1 | 7/2012 | Phelan et al. | |
| 2013/0066665 A1 | 3/2013 | Tamhane et al. | |
| 2014/0100964 A1 | 4/2014 | Kramer et al. | |
| 2014/0278747 A1 | 9/2014 | Gumm | |
| 2014/0378071 A1 | 12/2014 | Acousta | |
| 2015/0019662 A1 | 1/2015 | O'Kane et al. | |
| 2015/0170213 A1 | 6/2015 | O'Malley | |
| 2015/0227962 A1 | 8/2015 | Wical et al. | |
| 2015/0294349 A1* | 10/2015 | Capel | H04W 4/02 |
| | | | 705/14.43 |
| 2016/0117717 A1* | 4/2016 | Moreau | G06Q 30/0245 |
| | | | 705/14.42 |
| 2016/0189176 A1 | 6/2016 | Newnham | |
| 2018/0082326 A1 | 3/2018 | Massis et al. | |
| 2019/0122254 A1 | 4/2019 | Duquette et al. | |
| 2019/0259041 A1 | 8/2019 | Jackson | |
| 2020/0327577 A1 | 10/2020 | Truong et al. | |
| 2021/0109897 A1 | 4/2021 | Brechbuhl et al. | |
| 2021/0133852 A1* | 5/2021 | Vauthey | G06Q 30/0617 |
| 2022/0283932 A1 | 9/2022 | Arbour et al. | |

OTHER PUBLICATIONS

C-CMAS Model, summary of research findings and implication for Content Creation and Management Automation System (CMAS), Choo Wou Onn; Halimah Badioze Zaman; Chue Wen Yeen, 2008 International Symposium on Information Technology, Year: 2008 | Conference Paper | Publisher: IEEE. (Year: 2008).*

* cited by examiner

Determining the range of values that the N success rates of N different templates could take given a pre-defined level of random chance
910

Comparing a fraction of credible intervals that are overlapping, wherein credible intervals include a range of values that the success rate is likely to fall within after accounting for random chance
920

Checking that these ranges of values indicate a sufficiently higher success rate for the leading variation after accounting for random chance
930

*FIG. 9*

Applying an adaptive method to set an allocation of electronic message recipients to templates that are performing better (wherein better means a better success rate),
1010

Randomly assigning the electronic message recipients to the first template and the second template based on the allocation
1020

Sending the first template or second template to the electronic message recipients as randomly assigned
1030

*FIG. 10*

```
┌─────────────────────────────────────────────────────────────────────────────┐
│ Generating, by a server, at least a first template of the electronic message│
│ and a second template of the electronic message, each of the first template │
│ and the second template having at least a different content                 │
│                                  1210                                       │
└─────────────────────────────────────────────────────────────────────────────┘
                                     ▼
┌─────────────────────────────────────────────────────────────────────────────┐
│ Assigning, by the server, a respective group of electronic message recipients│
│ to the first template of the electronic message and the second template of  │
│ the electronic message, wherein the assigning is random                     │
│                                  1220                                       │
└─────────────────────────────────────────────────────────────────────────────┘
                                     ▼
┌─────────────────────────────────────────────────────────────────────────────┐
│ Determining automatically, by the server, whether the first template of the │
│ electronic message has a statistical advantage over the second template of  │
│ the electronic message                                                      │
│                                  1230                                       │
└─────────────────────────────────────────────────────────────────────────────┘
                                     ▼
┌─────────────────────────────────────────────────────────────────────────────┐
│ Collecting test data from testing including deliveries, and successes of the│
│ first template of the electronic message and the second template of the     │
│ electronic message                                                          │
│                                  1240                                       │
└─────────────────────────────────────────────────────────────────────────────┘
                                     ▼
┌─────────────────────────────────────────────────────────────────────────────┐
│ Generating estimates of a success rates for the first template and the      │
│ second template including applying an analysis method to the collected test │
│ data to determine a win probability difference between a win probability for│
│ the first template and a win probability for the second template, and       │
│ determine that the win probability difference is greater than a selected win│
│ threshold                                                                   │
│                                  1250                                       │
└─────────────────────────────────────────────────────────────────────────────┘
                                     ▼
┌─────────────────────────────────────────────────────────────────────────────┐
│ Determining that a precision of the estimates of the success rate is greater│
│ than a precision threshold                                                  │
│                                  1260                                       │
└─────────────────────────────────────────────────────────────────────────────┘
                                     ▼
┌─────────────────────────────────────────────────────────────────────────────┐
│ Determining that greater than a volume threshold of test data has been      │
│ collected                                                                   │
│                                  1270                                       │
└─────────────────────────────────────────────────────────────────────────────┘
```

*FIG. 12*

TESTING OF TEMPLATES OF ELECTRONIC MESSAGES

FIELD OF THE DESCRIBED EMBODIMENTS

The described embodiments relate generally to intelligent electronic commerce. More particularly, the described embodiments relate to systems, methods, and apparatuses for testing of templates of electronic messages.

BACKGROUND

Templates can be used for defining an electronic message which can be provided to electronic message recipients. Different electronic messages can have different levels of success when provided to the electronic message recipients (customers).

It is desirable to have methods, apparatuses, and systems for testing templates of electronic messages.

SUMMARY

An embodiment includes a computer-implemented method for testing templates of electronic messages. The method includes continuously sending, by a server, a main electronic message, wherein at least a content of the main electronic message is determined by a main message template, creating a plurality of test templates including at least an A template and a B template, initiating, by the server, testing of test electronic messages, wherein at least a content of one test electronic message is determined by the A template, and at least the content of another of the test electronic message is determined by the B template, wherein editing of the test electronic messages occurs simultaneous with the continuous sending of the main electronic message, and selecting, by the server, a winning template of the A template and the B template. An embodiment further includes switching, by the server, between the sending of the main message and the sending of the test messages, wherein no customer of the merchant receives both the main message and any one of the test messages (mutual exclusivity) and all customers receive at least one of the main message or one of the test messages.

Another embodiment includes a system for testing templates of electronic messages. The system includes a merchant server configured to operate and manage a website, a plurality of customer devices configured to receive electronic messages; and a server electronically connected to the merchant server and the plurality of customer devices. For an embodiment, the server is configured to continuously send a main electronic message, wherein at least a content of the main electronic message is determined by a main message template, create a plurality of test templates including at least an A template and a B template. initiate testing of test electronic messages, wherein at least a content of one test electronic message is determined by the A template, and at least the content of another of the test electronic message is determined by the B template, wherein editing of the test electronic messages occurs simultaneous with the continuous sending of the main electronic message, select a winning template of the A template and the B template, and switch between the sending of the main message and the sending of the test messages, wherein no customer of the merchant receives both the main message and any one of the test messages and all customers receive at least one of the main message or one of the test messages.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of a method of determining a precision estimate of a success rate of a template, according to an embodiment.

FIG. 10 is a flow chart that includes steps of a method for assigning a respective group of electronic message recipients to a first template of an electronic message and a second template of an electronic message, according to an embodiment.

FIG. 12 is a flow chart of steps of a method of automated testing and selection of multiple templates of an electronic message, according to an embodiment.

DETAILED DESCRIPTION

The embodiments described include methods, apparatuses, and systems for automated testing of templates of electronic messages.

Figure 1:
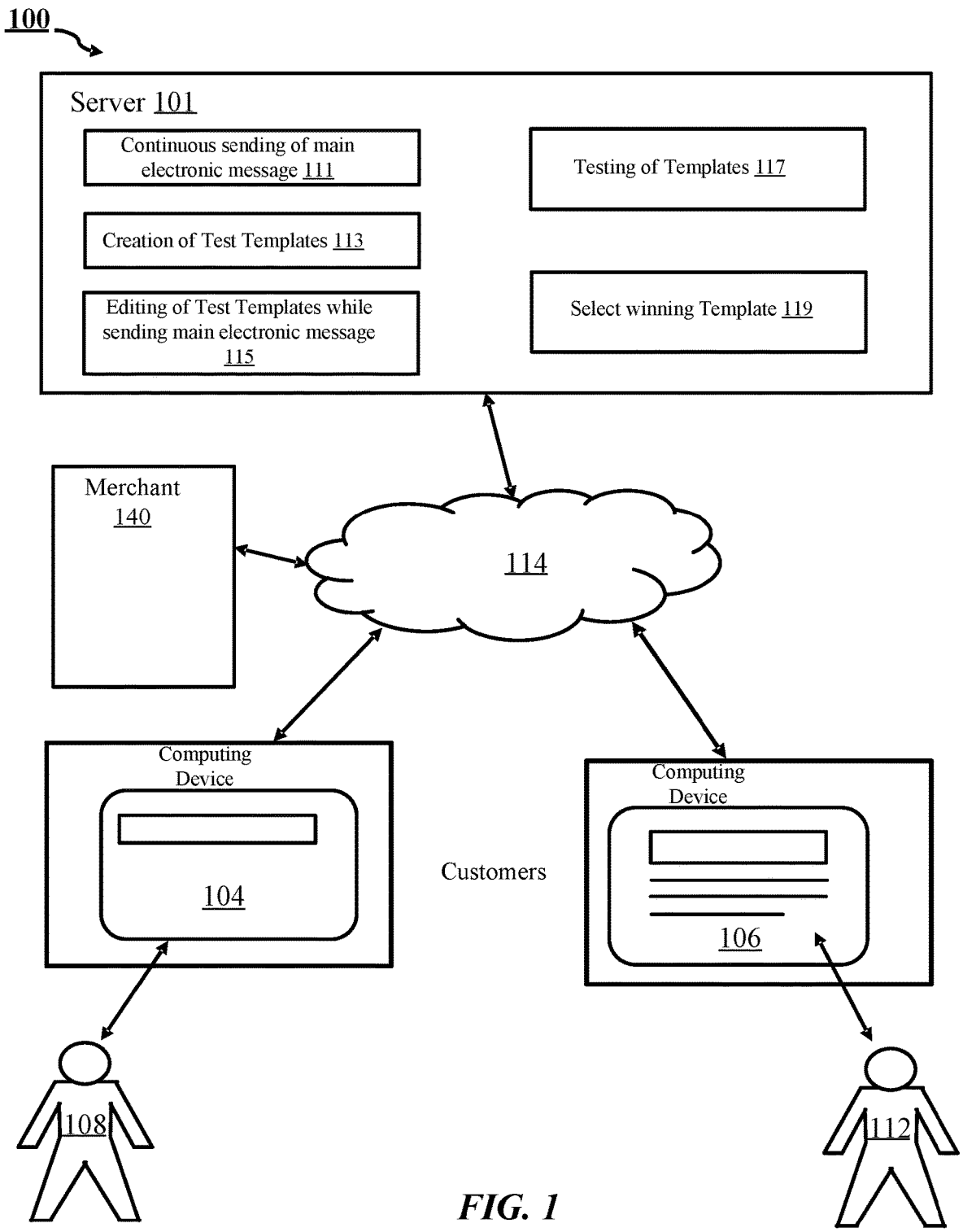
FIG. 1 shows a system for testing templates of electronic messages, according to an embodiment.

FIG. 1 shows a system 100 for automated testing and selection of a template of an electronic message, according to an embodiment. The system 100 includes a server 101. For an embodiment, the server 101 is electronically connected through a network 114 to electronic devices 104, 106 of message recipients 108, 112. For an embodiment, the server 101 operates to generate at least a first template (A) of an electronic message and a second template (B) of the electronic message each having different content. Though described here as the generation of a first template (A) and a second template (B), it is to be understood that the server 101 operates to generate N templates that include the first template and a second template.

A merchant server (merchant) 140 operates and manages an ecommerce website. For an embodiment, the merchant server 140 includes a server of a business that operates to directly control the ecommerce website. For an embodiment, the merchant server 140 includes a combination of the business and a third party to operate to control the ecommerce website. For an embodiment, the merchant server 140 is a customer of the operator of the server 101. For an embodiment, the merchant server 140 is a combination of the customer of the operator of the server 101 and a third party (such as, a Shopify platform).

For an embodiment, each of the N templates includes a set of data objects that combine to represent a structure of an electronic message. As described, the first and second templates of the N templates of the electronic message each have a different content. Accordingly, the set of data objects of each of the first and second templates combine to represent a structure of electronic messages having a different content. The structure of an electronic message includes the content. For an embodiment, the first and second templates determine content and of electronic messages to be tested. The testing of the template defined message includes additional information pertaining to the testing of the electronic message(s). The additional information can include, for example, a test name, a description of a test (makes it easier to remember what is being tested), an ending date, and/or specific settings that correspond to statistical significance criteria. For an embodiment, the additional information pertaining to the testing combined with the data for the templates define a test.

For an embodiment, the server 101 operates to continuously send 111 a main electronic message, wherein at least a content of the main electronic message is determined by a main message template. That is, a previously selected template is designated as the main template that defines the main electronic message being sent to, for example, computing devices 104, 106.

For an embodiment, the server 101 operates to create 113 a plurality of test templates including at least an A template and a B template. Once created, for an embodiment, the server 101 further operates to initiate testing 117 of test electronic messages, wherein at least a content of one test electronic message is determined by the A template, and at least the content of another of the test electronic message is determined by the B template.

For an embodiment, the server 101 further operates to allow editing 115 of the test electronic messages simultaneously with the continuous sending 111 of the main electronic message. That is, while the main message is being sent, the merchant of the merchant server 140 can edit the templates of the message that will be tested. Allowing the merchant to edit the templates of the test messages while the main message is being sent is advantageous because it allows the merchant to be doing the editing while continuing marketing activities uninterrupted.

For an embodiment, the server 101 further operates to select 119 a winning template of the A template and the B template. Once selected, the winning template can replace the main template for controlling the main message.

For an embodiment the main message includes an electronic message already being continuously sent 111 to users irrespective of any testing of templates. For an embodiment, the testing 117 includes a single instance of comparison of at least templates A and B with associated events such as placed orders, clicks, etc. For an embodiment, editing 115 by the merchant includes a merchant editing at least templates A and B. For an embodiment, while being edited, the test messages of the template are not being sent to any of the customers. As described, for an embodiment, the main message is being sent to one or more customers while the test templates are being edited so that the merchant can continue marketing activities uninterrupted.

For an embodiment, in addition to the main message and the test messages, a coordinating object exists that specifies the relationship between the aforementioned messages, rules for choosing which message to send to a given user, the status of the test itself, the storage of records of current and previous experiments, and the strategy for associating successes and failures with all of the messages.

Figure 2:
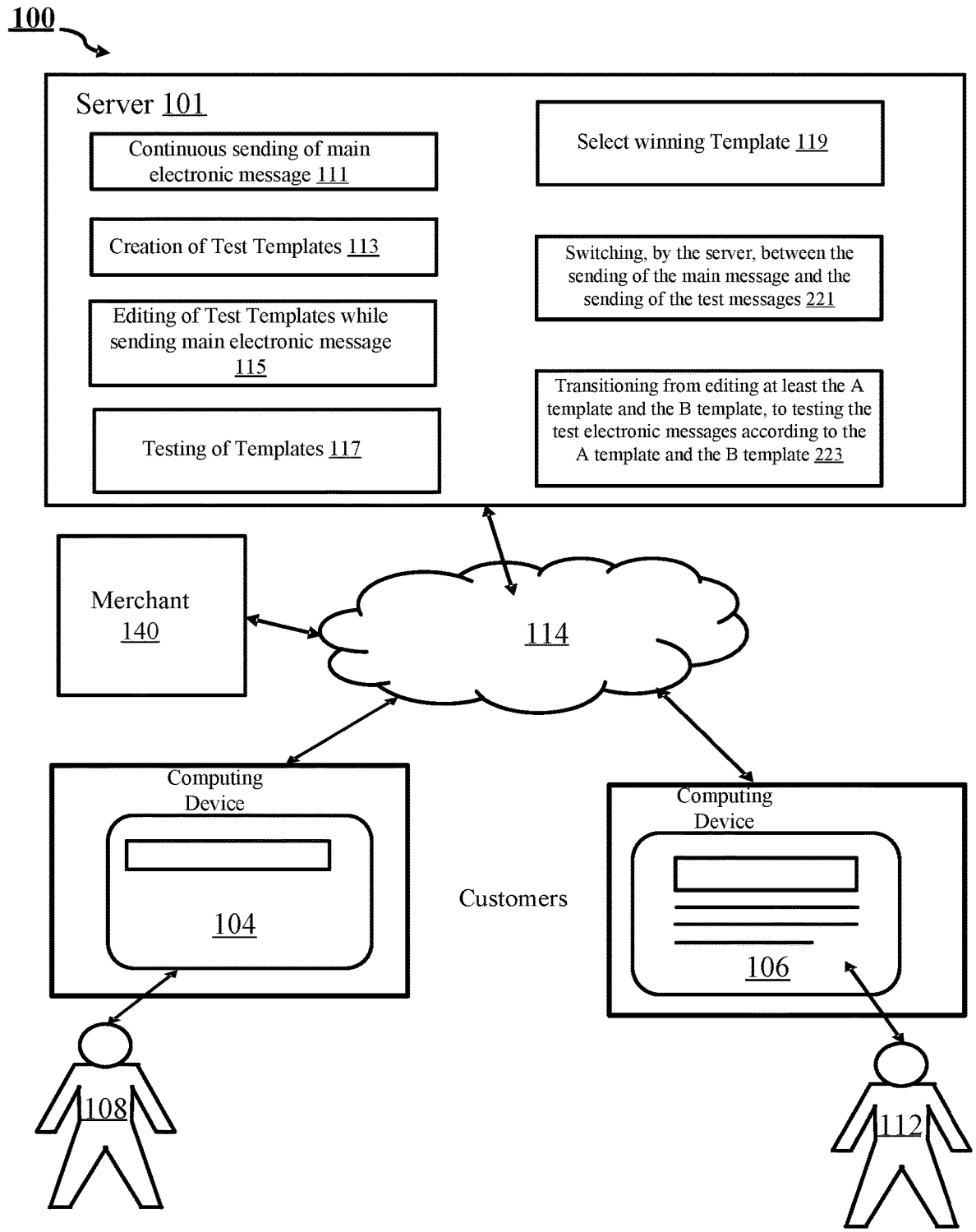
FIG. 2 shows a system for testing of templates of electronic messages that includes switching to electronic messages of winning templates, according to an embodiment.

FIG. 2 shows a system for testing of templates of electronic messages that includes switching 221 to electronic messages of winning templates, according to an embodiment. That is, for an embodiment, the server 101 is further configured to switch between the sending of the main message and the sending of the test messages, wherein no customer of the merchant receives both the main message and any one of the test messages (mutual exclusivity) and all customers receive at least one of the main message or one of the test messages.

For an embodiment, the server 101 further operates to transition 223 from editing at least the A template and the B template, to testing the test electronic messages according to the A template and the B template, wherein the transition is initiated by the merchant. That is, for an embodiment, the merchant initiates a state transition from a draft experiment (editing of templates) to a live experiment (continuously sending the main message), and the server 101 makes this happen.

For an embodiment, sending of the main electronic message ceases during the testing. That is, as stated, the customer either receives the main message, or test messages during the testing of the templates. For an embodiment, during a live A/B testing of the templates, all messaging that was previously scheduled to be sent to the main message is rescheduled to be sent to one of the templates consisting of at least A and B. The testing is started and events such as placed order etc. begin to be associated with the individual templates of at least A and B as well as the experiment itself and a larger notion of a "test container" which stores a series of experiments. As stated, for an embodiment, the sending of the main message and the sending of the test messages is mutually exclusive. For an embodiment, templates are also editable during the sending of the messages, but the merchant may be discouraged from doing so in some scenarios that may impact the testing negatively.

An embodiment includes a merchant of the merchant server 140 editing at least one of the main message template, the A template, or the B template during the continuous sending of the main electronic message. For an embodiment, the server 101 operates to coordinate the sending of the main message, editing of the A template and the B template, testing of messages according to the A template and the B template, and selecting a winning template over time. For an embodiment, the coordinating includes switching from sending the main message to testing the test messages of the test templates, ending the testing by selecting winning template, sending the winner as the new main message, allowing a new draft of a new test involving at least templates A' and B' based on the winning template to be edited, switching from sending the winning message to the new test templates. For an embodiment, this coordination is repeated over and over. For at least some embodiments, the described coordination, provides the merchant with insight for continually improving marketing strategies.

A test container may be defined as a container to coordinate main messages, variation templates, experiments, and winning messages over time such that a concept or series of related concepts can be logically grouped together in order for the merchant to gain insight into improving marketing strategies. Further, this may include handling the coordination of sending (of main messages and variation templates A & B . . . ) and aggregation and storage of the results of the testing. For an embodiment, the merchant can edit and prepare templates A and B in the test while still sending the main message. For an embodiment, the main message can also be edited during the preparation of the test, without affecting the content of templates A and B.

For at least some embodiments, the server 101 is further operative replacing the main message template with the winner of the A template of the B template. For an embodiment, the server 101 operates to associate analytics of ongoing marketing communications associated with the winner message with the original main message, the variation messages, previous main messages, and previous variations.

For at least some embodiments, continuously sending the main electronic message as controlled by the server includes triggering the sending of the main electronic message. That is, for an embodiment, the main message is sent upon a triggering event occurring. For an embodiment, the trigger is based on at least one of variations of the main message, and/or template A or B. For an embodiment, the trigger is based on at least one of a customer being added to a list of customers, or a customer being added to a dynamically generated group of customers. For an embodiment, the trigger is based on at least one of an arbitrary set of criteria (segment), a dynamically ingested webhook event associated with the merchant (for example, a price drop on an item), an action that a customer has taken that the server has just associated with the customer (for example, an abandoned cart), and/or a date associated with the customer or merchant (for example, holidays that the company cares about, or the customers birthday).

Figure 3:
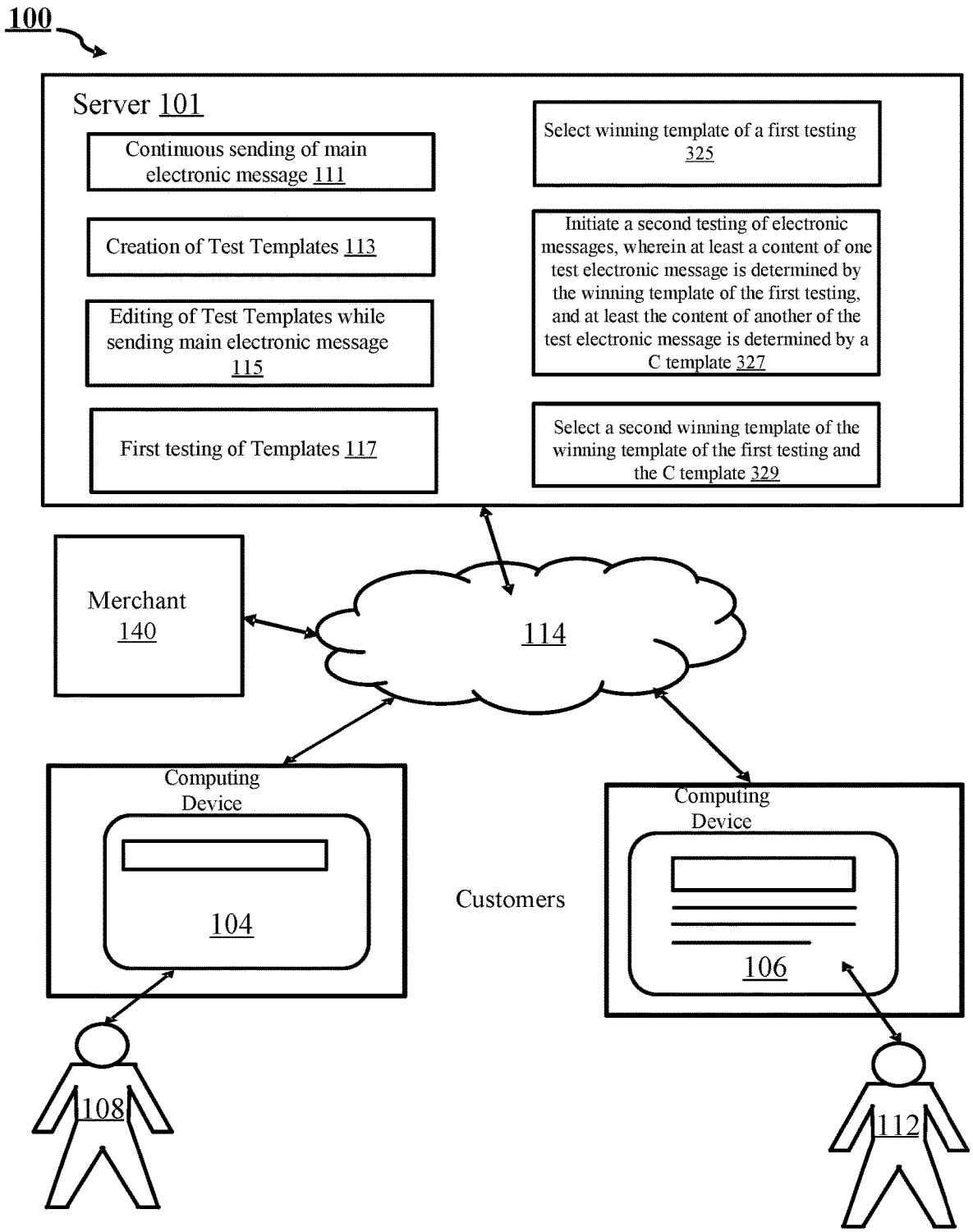
FIG. 3 shows a system for testing of templates of electronic messages that includes additional testing of winning templates, according to an embodiment.

FIG. 3 shows a system for testing of templates of electronic messages that includes additional testing of winning templates, according to an embodiment. For at least some embodiments, the server is further configured to select 325 a winning template of a first testing of electronic messages, initiate 327 a second testing of electronic messages, wherein at least a content of one test electronic message is determined by the winning template of the first testing, and at least the content of another of the test electronic message is determined by a C template, and select 329 a second winning template of the winning template of the first testing and the C template. That is, the merchant can build on the results of a previous testing X by making a new testing Y wherein a copy of the winning template of testing X is tested against a new template C.

Figure 4:
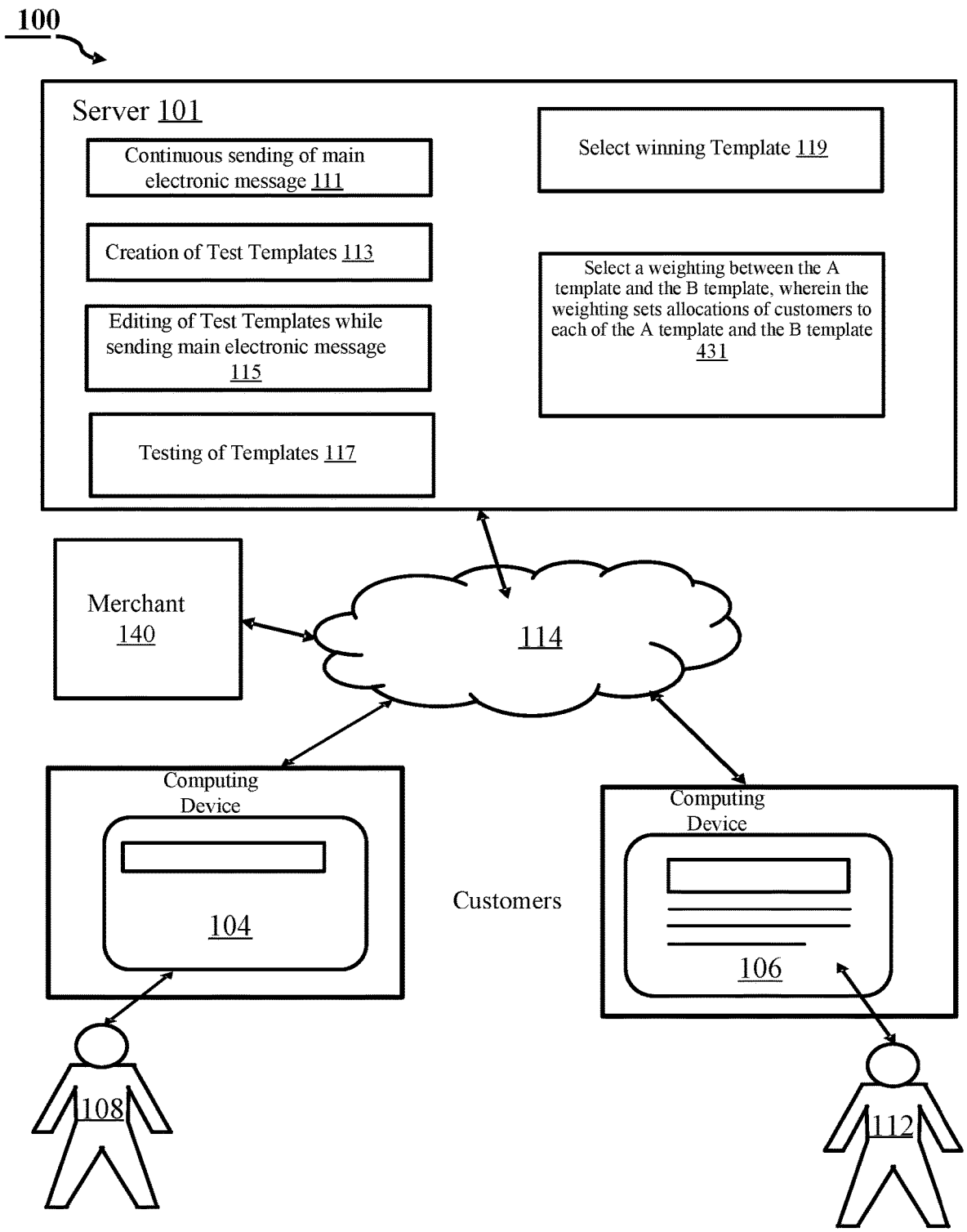
FIG. 4 shows a system for testing of templates of electronic messages that includes weighting of templates during testing of the templates, according to an embodiment.

FIG. 4 shows a system for testing of templates of electronic messages that includes weighting of templates during testing of the templates, according to an embodiment. For an embodiment, a merchant of the merchant server 140 selects 431 a weighting between the A template and the B template, wherein the weighting sets allocations of test messages being sent to customers according to each of the A template and the B template. That is, a set number of customers are to receive the test messages according to the A and B templates. The weighting sets the ratio or percent of customers that receive each of the test messages according to the A template and the B template.

For an embodiment, the server 101 adaptively selects 431 a weighting between the A template and the B template, wherein the weighting sets allocations of customers to each of the A template and the B template. For an embodiment, the server 101 adaptively selects the weighting based on which test electronic message is winning the testing of the templates. Various embodiments for identifying the winning template will be described. For an embodiment, the server 101 adaptively selects the weighting based on which variation of the templates is getting the most success rate (customers performing an action based on receiving the corresponding electronic message).

For an embodiment, the main electronic message includes a single electronic message. For some embodiments, having the main electronic message only being a single message can be advantageous over arbitrary sets of messages because merchants find this easier to use in certain scenarios as the cognitive load is lower. For example, attribution of events is easier to compare, making for more rigorous and valid statistical tests.

Figure 5:
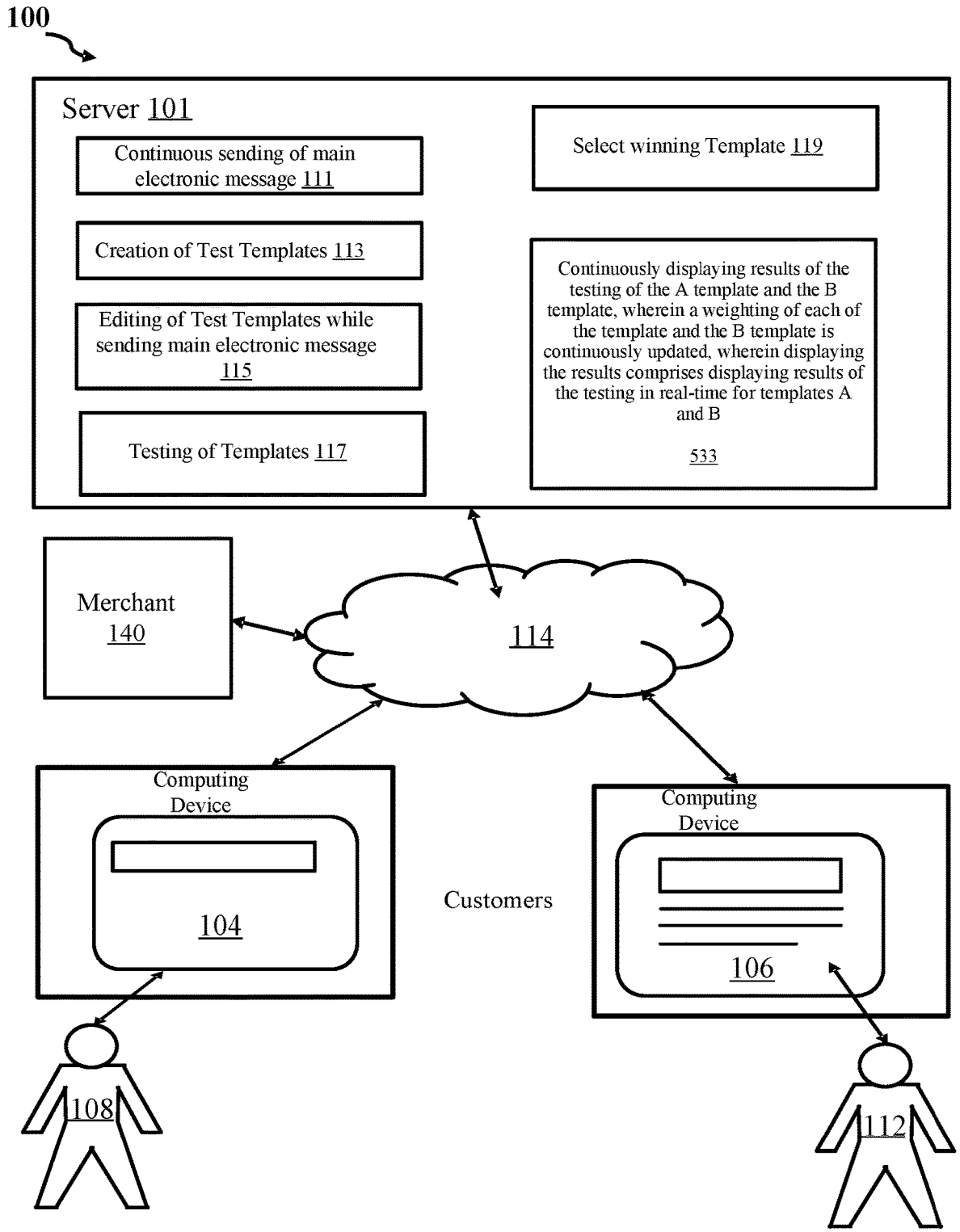
FIG. 5 shows a system for testing of templates of electronic messages that includes continuous displaying of results of testing of the templates, according to an embodiment.

FIG. 5 shows a system for testing of templates of electronic messages that includes continuous displaying of results of testing of the templates, according to an embodiment. For an embodiment, the A template and the B template are continuously tested, and for an embodiment, the results of the testing are continuously displayed to the merchant. At least some embodiments include continuously displaying 533 results of the testing of the A template and the B template, wherein a weighting of each of the template and the B template is continuously updated. For an embodiment, displaying the results includes displaying results of the testing in real-time for templates A and B.

For an embodiment, displaying the results includes displaying results of a series of completed testing of messages according to templates grouped with a live test, thereby allowing the merchant to make decisions based on the completed tests and a current test. For at least some embodiments, allowing the merchant to view the results of multiple tests in aggregate can provide insights that displaying a single test result alone does not. At least some embodiments include both displaying test results in aggregate or individually (that is, one testing at a time).

For an embodiment, displaying the results includes displaying real-time results for data associated with past testing, current testing, past main messages, and/or a live main electronic message. For an embodiment, the main message and past main message have the winning templates of past winners of the testing.

For at least some embodiments, the displaying of results includes multiple time scales. For an embodiment, during the testing, the results are displayed in real-time for templates A and B in a way that the displaying does not compromise the testing. For an embodiment, for a series of completed tests, the results of the completed tests are retained and displayed grouped with another live (current) test such that the merchant can make decisions based on all experiments associated with the same testing group. For an embodiment, the displaying of the results of the testing includes real-time results for all data associated with any past tests, any current test, any past main message, and/or any live (current) main message.

Figure 6:
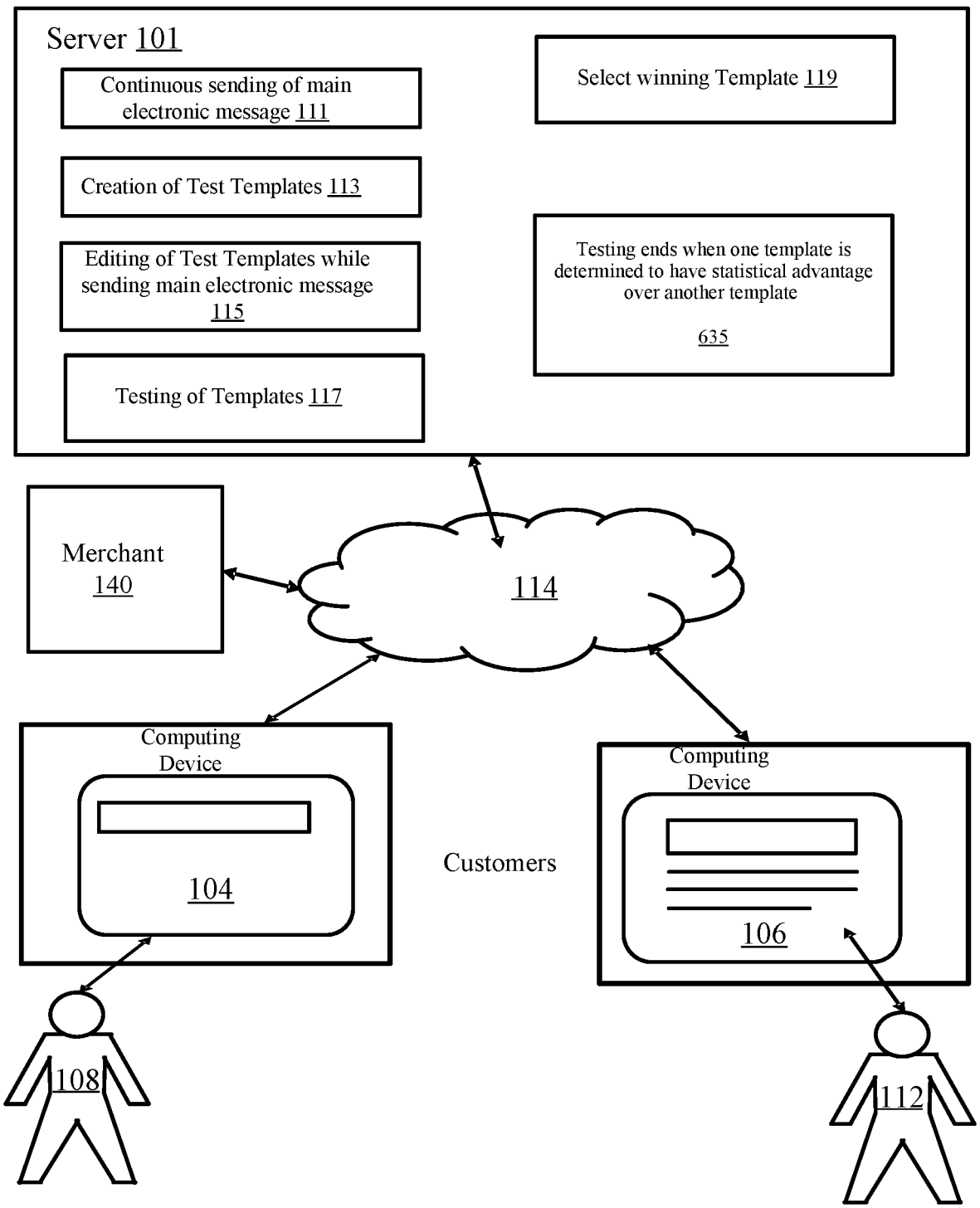
FIG. 6 shows a system for testing of templates of electronic messages that includes testing of the templates being completed when one template is determined to have a statistical advantage, according to an embodiment.

FIG. 6 shows a system for testing of templates of electronic messages that includes testing of the templates being completed when one template is determined to have a statistical advantage, according to an embodiment. For an embodiment, the testing ends 635 (at least a current test) when one template is determined to have statistical advantage over another template.

For an embodiment, determining a statistical advantage of one template over another includes collecting test data from testing including deliveries of the test electronic messages (delivery of email, SMS, push, etc. associated with templates A and B) and interactions with the test electronic message of the A template and the test electronic message of the B template. Determining the statistical advantage one template over another includes generating estimates of a success rates for the A template and the B template including applying an analysis method to the collected test data to determine a win probability difference between a win probability for the A template and a win probability for the B template, and determine that the win probability difference is greater than a selected win threshold, determining that a precision of the estimates of the success rate is greater than a precision threshold, and determining that greater than a volume threshold of test data has been collected, determining the statistical advantage when the selected win threshold, the precision threshold, and the volume threshold are all met. Further, for an embodiment, once the statistical advantage has been determined, the winner of the testing is then for the main message. That is, for an embodiment, the winning template replaces the main message template.

For an embodiment, the testing ends as selected by a merchant of the server. That is, the merchant may select a winning template manually, or allow the server to select a winning template based either on a selected date, or when a template's performance achieves statistically significant advantage over all other templates. At that time, the winning template is copied into a new "main message", the experiment data and template data are retained, and any future customers of the merchant are scheduled to receive the new main message (that is, the winning message of the testing).

For at least some embodiments, a template may define more than just the content of the message. For an email, this may mean anything contained in the body of the email, the subject line, the preview text, the cc email, the bcc email, the reply-to email, sender name, a name for the variation to make tracking of the performance of the variation easier for the merchant. In this case, will not include send times. For a mobile message, this may include compliance settings, the body of the text message, an image, a video, a virtual contact card, and/or the geographical region.

Figure 7:
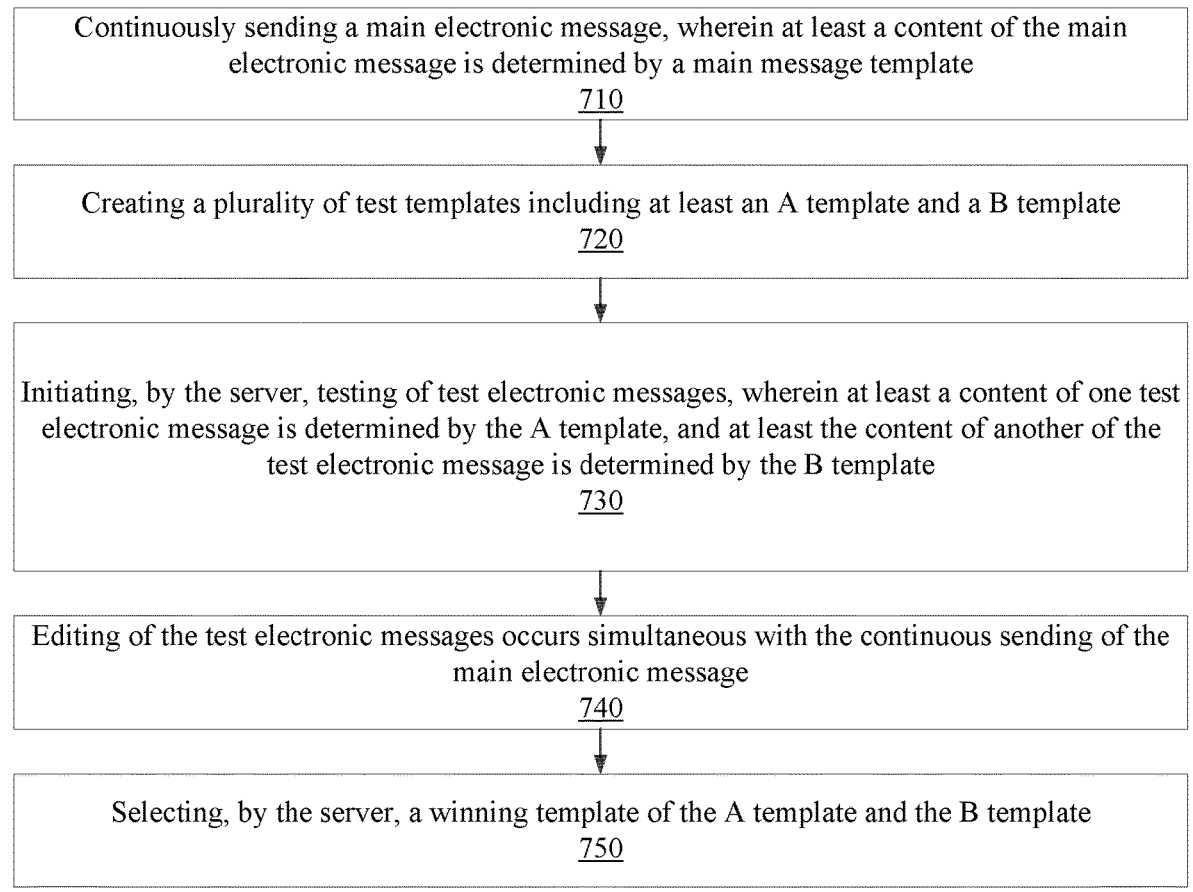
FIG. 7 is a flow chart that includes steps of a method for testing templates of electronic messages, according to an embodiment.

FIG. 7 is a flow chart that includes steps of a method for testing templates of electronic messages, according to an embodiment. A first step 710 includes continuously sending, by a server, a main electronic message, wherein at least a content of the main electronic message is determined by a main message template. A second step 720 includes creating a plurality of test templates including at least an A template and a B template. A third step 730 includes initiating, by the server, testing of test electronic messages, wherein at least a content of one test electronic message is determined by the A template, and at least the content of another of the test electronic message is determined by the B template. A fourth step 740 includes editing of the test electronic messages simultaneous with the continuous sending of the main electronic message. A fifth step 750 includes selecting, by the server, a winning template of the A template and the B template.

As previously described, an embodiment further includes switching, by the server, between the sending of the main message and the sending of the test messages, wherein no customer of the merchant receives both the main message and any one of the test messages and all customers receive at least one of the main message or one of the test messages.

As previously described, an embodiment further includes transitioning from editing at least the A template and the B template, to testing the test electronic messages according to the A template and the B template, wherein the transition is initiated by the merchant. For an embodiment, sending of the main electronic message ceases during the testing.

As previously described, an embodiment further includes a merchant of the merchant server editing at least one of the main message template, the A template, or the B template during the continuous sending of the live electronic message.

As previously described, an embodiment further includes coordinating the sending of the main message, editing of the A template and the B template, testing of messages according to the A template and the B template, and selecting a winning template over time. As previously described, an embodiment further includes switching replacing the main message template with the winner of the A template of the B template.

As previously described, for an embodiment, continuously sending the main electronic message includes triggering the sending of the main electronic message based on at least one of a customer being added to a list of customers, a customer being added to a dynamically generated group of customers based on an arbitrary set of criteria (segment), a dynamically ingested webhook event associated with the merchant, an action that a customer has taken that the server has just associated with the customer, a date associated with the customer or the merchant.

As previously described, an embodiment further includes a merchant of the merchant server selecting a weighting between the A template and the B template, wherein the weighting sets allocations of the test messages being sent to customers according to each of the A template and the B template. As previously described, an embodiment further includes the server adaptively selecting a weighting between the A template and the B template, wherein the weighting sets allocations of customers to each of the A template and the B template. For an embodiment, the server adaptively selects the weighting based on at least which test electronic message is winning the testing of the A template and the B template.

As previously described, for an embodiment the A template and the B template are continuously tested. As previously described, an embodiment further includes continuously displaying results of the testing of the A template and the B template, wherein a weighting of each of the template and the B template is continuously updated. For an embodiment, displaying the results comprises displaying results of the testing in real-time for templates A and B. For an embodiment, displaying the results includes displaying results of a series of completed testing of messages according to templates grouped with a live test, thereby allowing the merchant to make decisions based on the completed tests and the live test. For an embodiment, displaying real-time results for data associated with past testing, current testing, past main messages, or a live main electronic message.

For an embodiment, the testing ends when one template is determined to have statistical advantage over another template. For an embodiment, determining the statistical advantage includes collecting test data from testing including deliveries of the test electronic messages and interactions with test electronic message of the A template and the test electronic message of the B template, generating estimates of a success rates for the A template and the B template including applying an analysis method to the collected test data to determine a win probability difference between a win probability for the A template and a win probability for the B template, and determine that the win probability difference is greater than a selected win threshold, determining that a precision of the estimates of the success rate is greater than a precision threshold, determining that greater than a volume threshold of test data has been collected, and determining, by the server, the statistical advantage when the selected win threshold, the precision threshold, and the volume threshold are all met.

At least some embodiments further include selecting a winning template of a first testing of electronic messages, initiating a second testing of electronic messages, wherein at least a content of one test electronic message is determined by the winning template of the first testing, and at least the content of another of the test electronic message is determined by a C template, and selected by the server, a second winning template of the winning template of the first testing and the C template.

Statistically Determining the Winning Template

For an embodiment, the server 101 further operates to determine automatically whether the first template of the electronic message is statistically more advantageous than the second template of the electronic message. For an embodiment, the server 101 operating to determine the statistical advantage includes collecting test data from testing including delivery, and successes of the first template of the electronic message and the second template of the electronic message. Generally, an electronic message with a statistical advantage is better at soliciting a desired response from an electronic message recipient.

Delivery of Electronic Messages

For at least some embodiments, the electronic message recipient is delivered the electronic message for at least one of multiple reasons, such as a geolocation of the electronic message recipient, defined user behavior characteristics of the electronic message recipient (for example, the electronic message recipient has purchased from the site within the last 7 days), or a page URL (except amount of time spent on the page or amount of page scrolled or exit intent).

Deliveries

For at least some embodiments, a merchant sets some qualifications that customers must meet in order to be eligible to receive electronic messages. For example, a merchant might create an "abandoned cart flow" that works as follows: When a customer abandons their cart, the server 101 waits 4 hours and then sends the customer an electronic message (automatically) reminding the customer about their cart. In addition to this logic, for an embodiment, the merchant sets a "flow filter", which restricts which customers are eligible to remain in the flow. For example, in this abandoned cart flow, the merchant might define a flow filter of "exclude customers who have made a purchase since entering this flow". This way, customers who have revisited their cart and made a purchase will not get the reminder message about their cart 4 hours later. The merchant can add as many "flow filters" as they like to determine which customers should be eligible to receive the messages in the flow, based on properties about the customers, actions the customers have taken, etc. This is to say that an "electronic message delivery" happens for a customer if and only if that customer qualifies to receive the message, given the filtering criteria chosen by the merchant.

Successes

For an embodiment, successes include the electronic message recipient(s) carrying out a main action that an electronic message is intended to elicit, such as, for example, clicking a link in the electronic message (potentially embedded in an image), or making a purchase on the website linked to in the electronic message. At least some embodiments include electronically sensing whether the electronic message recipient has performed the main action. Further, the electronic message recipients may receive the electronic messages via mobile device, such as, a cellular phone. Accordingly, physical actions of the electronic message recipients can be tracked to determine whether the electronic message recipient(s) carried out a main action that the electronic message is intended to elicit. That is, sensors, such as, location sensors, such as, GPS (global positioning system) sensors, and/or motion sensors (such as, accelerometers, gyroscopes, and/or magnetic sensors) can be used to track the locations and actions of the electronic message recipient(s) to determine whether the electronic message recipient(s) performed the main action or another action.

For at least some embodiments, the server 101 further operates to generate estimates of success rates for the first template and the second template including applying an analysis method to the collected test data to determine a win probability difference between a win probability for the first template and a win probability for the second template and determining that the win probability difference is greater than a selected win threshold.

For at least some embodiments, the server 101 further operates to determine that a precision of the estimates of the success rate is greater than a precision threshold and determines that greater than a volume threshold of test data has been collected, For an embodiment, the statistical advantage is declared for the first template when the selected win threshold, the precision threshold, and the volume threshold are all met. That is, the first template is determined to perform statistically better than the second template when the selected win threshold, the precision threshold, and the volume threshold are all met. The decision may be made by the merchant to favor the first template over the second template based on the statistical advantage demonstrated by the first template over the second template. For an embodiment, the server 101 automatically operates to favor the first template over the second template based on the statistical advantage demonstrated by the first template over the second template.

For at least some embodiments, the selected win threshold, the precision threshold, and the volume threshold are all preselected. For an embodiment, at least one of the selected win threshold, the precision threshold, and the volume threshold are preselected, and at least one other of the selected win threshold, the precision threshold, and the volume threshold is adaptively adjusted. For an embodiment, the selected win threshold, the precision threshold, and the volume threshold are all adaptively adjusted.

Selected Win Threshold

For an embodiment, the selected win threshold is preselected based on best practices established over time. For an embodiment, the selected win threshold is adaptively selected based on input or feedback from the electronic message recipients. For an embodiment, the selected thresholds are determined through prior simulation. For an embodiment, the selected win threshold is changed over time based on at least one of a plurality of factors. The factors can include preferences of the merchant (that is, directly selecting a threshold (if the website operator has a level of statistical knowledge) or the merchant choosing how "aggressive" they want to be to find a winner early or how "sure" they want to be in an outcome], a detected anomaly (that is, for example, an error in data collection), or pattern in collected data (that is, a very spiky (variations of greater than a threshold amount) visit volume pattern on a website that makes the merchant want to regularize to avoid extreme spikes having an effect that is too large). For an embodiment, the selected win threshold is adaptively adjusted based on one or more of these listed factors.

Precision Threshold

For an embodiment, the volume threshold is preselected based on predicted or simulated false positive and false negative rates based on a number of deliveries and successes that are realistic, wherein realistic successes is based on historical data for delivery and customer engagement with an electronic message. For an embodiment, the volume threshold is adaptively selected based on data from data of a particular merchant, or the data of merchants that are similar (for example, a merchant that has similar observed patterns in business metrics and/or that sells similar products or is in a similar industry vertical a merchant with a similar amount of or pattern in electronic message deliveries).

Volume Threshold

For an embodiment, the volume threshold is preselected based on predicted or simulated false positive and false negative rates based on a number of deliveries and successes that are realistic, wherein realistic successes is based on historical data for delivery and customer engagement with an electronic message. For an embodiment, the volume threshold is adaptively selected based on data from data of a particular merchant, or the data of merchants that are similar (for example, a merchant that has similar observed patterns in business metrics and/or that sells similar products or is in a similar industry vertical a merchant with a similar amount of or pattern in electronic message deliveries).

As previously described, for an embodiment, the server 101 further operates to generate estimates of success rates for the first template and the second template including applying an analysis method to the collected test data to determine a win probability difference between a win probability for the first template and a win probability for the second template, and determine that the win probability difference is greater than a selected win threshold. For an embodiment, the analysis method includes generating a win probability, wherein the win probability represents a probability that a template variation currently leading the testing has a higher success rate than other variations after accounting for random chance. Example analysis methods include a Bayesian posterior probability or a frequentist p-value. For an embodiment, the random chance is accounted for by using at least one of these two methods.

Figure 8:
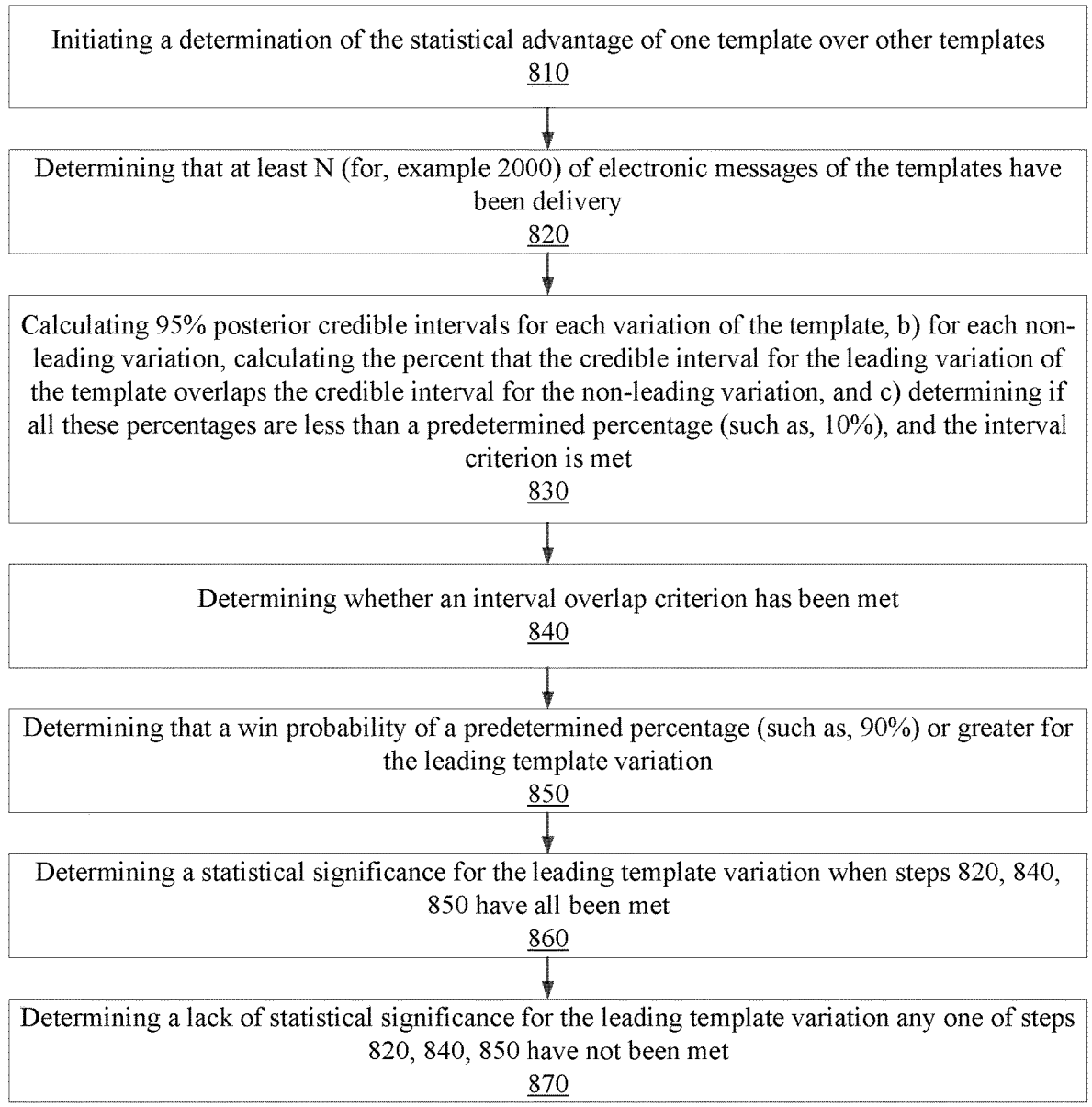
FIG. 8 is a flow chart that includes steps of a method for determining a statistical advantage of one template over another template, according to another embodiment.

FIG. 8 is a flow chart that includes steps of a method for determining a statistical advantage of one template over another template, according to another embodiment.

As previously described, for an embodiment, the statistical advantage is declared for the first template when the selected win threshold, the precision threshold, and the volume threshold are all met. A first step 810 of the flow chart of FIG. 8 includes initiating a determination of the statistical advantage of one template over other templates. A second step 820 includes determining that at least N (for example, 2000) deliveries of electronic messages of the templates have been made. The step 810 can be equated with the previously described volume threshold.

A third step 830 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 830 is a necessary step to compute the precision threshold.

A fourth step 840 includes determining whether an interval overlap criterion has been met. For an embodiment, the interval overlap criterion is true (met) if the percent overlap calculated in step 830 is less than a pre-selected precision threshold.

A fifth step 850 includes determining a win probability of a predetermined percentage (such as, 90%) or greater for the leading template variation. That is, the win probability threshold is satisfied.

A sixth step 860 includes determining a statistical significance for the leading template variation when steps 820, 840, 850 have all been met.

A seventh step 870 includes determining a lack of statistical significance for the leading template variation any one of steps 820, 840, 850 have not been met.

FIG. 9 is a flow chart that includes steps of a method of determining a precision estimate of a success rate of a template, according to an embodiment.

As previously described, at least some embodiments include checking that the precision of the estimates of the success rate is greater than a precision threshold. For an embodiment, checking that the precision of the estimates of the success rate is greater than a precision threshold includes 910 determining the range of values that the N success rates of N different templates could take given a predefined level of random chance.

For an embodiment, this includes 920 comparing a fraction of credible intervals that are overlapping, wherein credible intervals include a range of values that the success rate is likely to fall within after accounting for random chance, and 930 checking that these ranges of values indicate a sufficiently higher success rate for the leading variation after accounting for random chance. That is, step 930 includes determining whether the overlap fraction is small (below a certain threshold).

FIG. 10 is a flow chart that includes steps of a method for assigning a respective group of electronic message recipients (which may be customers of the merchant) to a first template of an electronic message and a second template of an electronic message, according to an embodiment. For an embodiment, assigning a respective group of the to the first template of the electronic message and the second template of the electronic message, wherein the assigning is random, includes 1010 applying an adaptive method to set an allocation of electronic message recipients to templates that are performing better (wherein better means a better success rate), 1020 randomly assigning the electronic message recipients to the first template and the second template based on the allocation, and 1030 sending the first template or second template to the electronic message recipients as randomly assigned. For an embodiment, the adaptive method includes multi-armed bandit optimization (MABO). For an embodiment, the adaptive method includes a method using an approach of an adaptive clinical trial design where the allocation changes at a small number of pre-set times. For an embodiment, the assignment includes a weighted assignment (recipient allocation percentage). For an embodiment, the weighting represents a deviation from an even split between variations of the template being tested. For example, weights could be computed based on the current success rates of the templates in the test. Templates being more successful could have a weighting of the recipient allocation that is adaptively increased. Step 1452 of FIG. 14 includes an example of this.

Figure 11:
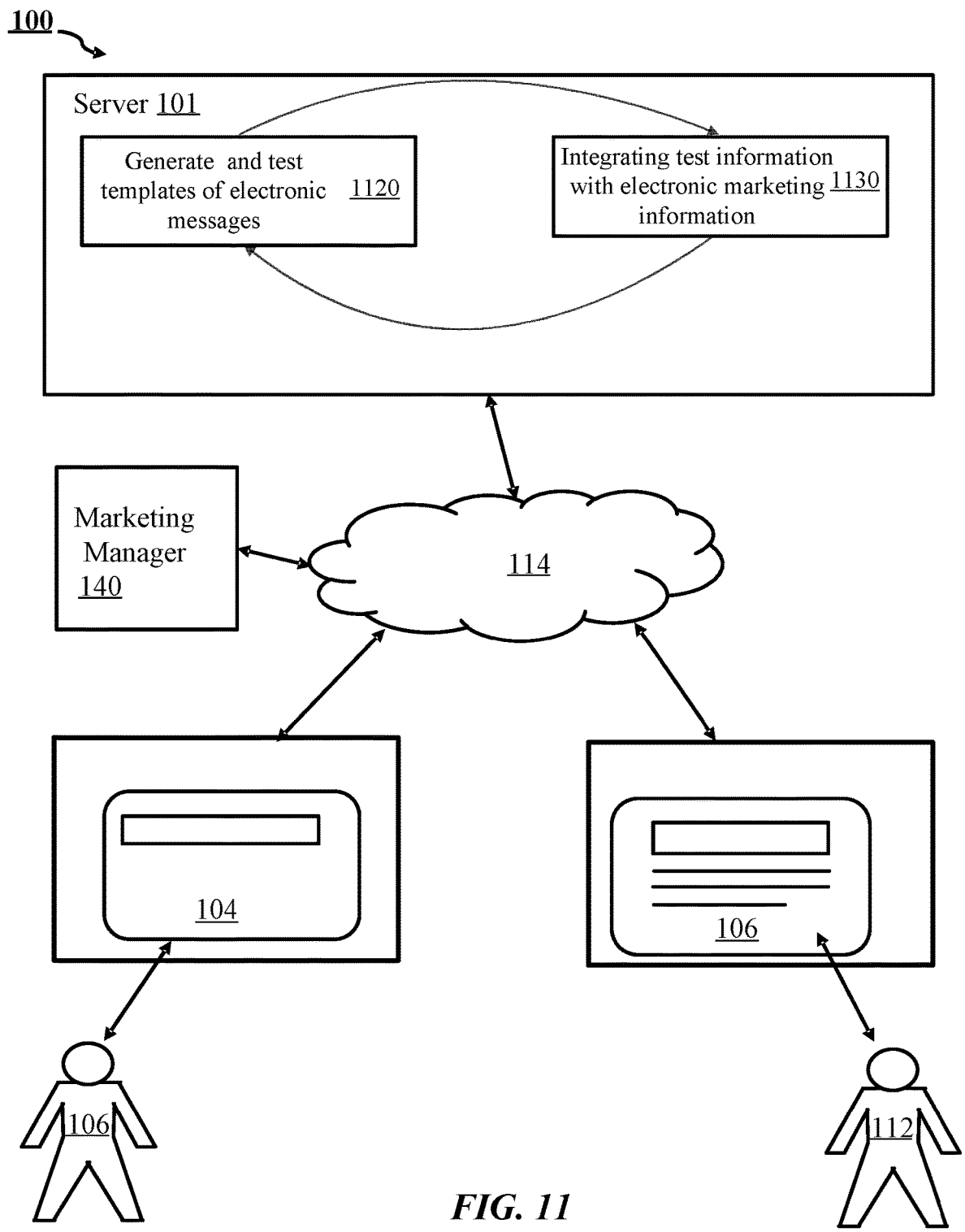
FIG. 11 shows a system that further includes integrating information received from the testing with electronic marketing information, according to an embodiment.

FIG. 11 shows a system that further includes integrating information received from the testing with electronic marketing information, according to an embodiment. As previously described, for an embodiment, the server 101 operates to generate and test templates of an electronic message 1120. However, for an embodiment, the generating and testing of the templates is test information that is integrated with electronic marketing information 1130.

For an embodiment, integrating the electronic marketing information includes using electronic marketing information to qualify the electronic message recipients. That is, for an embodiment, the electronic marketing information is used to target particular electronic message recipients. For example, for an embodiment, templates are targeted to customers that have taken certain actions which have been tracked. That is, the templates in a particular test are only shown to customers who have clicked a specific email. This relates closely to the previously described deliveries.

For an embodiment, content in the template(s) is dynamically updated based on actions or characteristics of the electronic message recipient. For example, different images of electronic messages of the templates are displayed to the recipients based on the last product that the electronic message recipient browsed on a website of the merchant.

For an embodiment, at least some of the test information determined during testing of the templates is used for influencing marketing information. For example, different coupons may be included with different tested templates to send emails with different discounts.

For an embodiment, integrating electronic marketing information includes ensuring that participants (electronic message recipients) in the test have all taken actions pertaining to other marketing actions. For example, the actions taken, can include opening or clicking an email within the last X (such as, 7) days. For an embodiment, marketing information is used to qualify participants.

For an embodiment, integrating electronic marketing information includes counting the number of test participants who viewed one template in the test and carried out another action. For example, this can include counting the number of test participants that have purchased a product within the last next Y (for example 7) days.

As previously described, for at least some embodiment, the templates A and B differ at least by content that can vary the display of the received electronic messages (email). Further, as previously described, the differing content can include one or more of anything contained in the body of the email, the subject line, the preview text, the cc email, the bcc email, the reply-to email, sender name, a name for the variation to make tracking of the performance of the variation easier for the merchant. For a mobile message, this may include compliance settings, the body of the text message, an image, a video, a virtual contact card, and/or the geographical region. For at least some embodiments, the templates A and B can be different across multiple of the differing content listed.

FIG. 12 is a flow chart of steps of a method of automated testing and selection of multiple templates of an electronic message, according to an embodiment. A first step 1210 includes generating, by a server, at least a first template of the electronic message and a second template of the electronic message, each of the first template and the second template having at least a different content.

As previously described, the first and second templates of N templates of the electronic message each have a different content or behavior. Accordingly, the set of data objects of each of the first and second templates combine to represent a structure of electronic messages having a different content and/or behavior. The structure of an electronic message includes the content and the behavior. The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

A second step 1220 includes assigning, by the server, a respective group of electronic message recipients to the first template of the electronic message and the second template of the electronic message, wherein the assigning is random. A third step 1230 includes determining automatically, by the server, whether the first template of the electronic message has a statistical advantage over the second template of the electronic message, which includes a fourth step 1240 of collecting test data from testing including deliveries, and successes of the first template of the electronic message and the second template of the electronic message, a fifth step 1250 of generating estimates of a success rates for the first template and the second template including applying an analysis method to the collected test data to determine a win probability difference between a win probability for the first template and a win probability for the second template, and determine that the win probability difference is greater than a selected win threshold, a sixth step 1260 of determining that a precision of the estimates of the success rate is greater than a precision threshold, and a seventh step 1270 of determining that greater than a volume threshold of test data has been collected.

An embodiment includes sending the first template of the electronic message to all eligible recipients when the first template of the electronic message is determined to have a statistical advantage over the second template of the electronic message. That is, for an embodiment, when the first template is determined to have a statistical advantage over the second template, the first template is identified as the winning template. As depicted at step 1460 of FIG. 14, for an embodiment, the winning template is sent to recipients with 100% allocation. The selection of the winning template based on the success rates of the templates integrates the process of template selection into the practical application of sending the most efficient and effective electronic messages to the recipients, thereby providing improvements in the computing process of sending electronic messages.

For an embodiment, the statistical advantage is declared for the first template when the selected win threshold, the precision threshold, and the volume threshold are all met. For an embodiment, the generating of the estimates, determining the precision, and determining the volume threshold, are performed simultaneously.

However, for an embodiment, the applied analysis method is optimized for conversion rates similar as conversion rates of those seen in electronic messages. For example, for a Bayesian prior that is constructed using historical electronic messages data. For an embodiment, this is specific to the expected data setting for an individual electronic message, using factors such as success rates on electronic messages with similar content and design, success rates on electronic messages from the same merchant or similar merchants, or patterns of engagement (successes) for the specific audience to which the electronic message is sent.

For an embodiment, determining that the precision of the estimates of the success rate is greater than a precision threshold includes comparing a fraction of credible intervals that are overlapping, wherein credible intervals include a range of values that the success rate is likely to fall within after accounting for random chance. As previously described, a third step 830 of FIG. 8 includes a) calculating 95% posterior credible intervals for each variation of the template representing the range of values that the success rate for this template is likely (in particular having a 95% level of confidence that the interval contains the true value of the success rate if infinite data is gathered) to take, and incorporating both the information contained in the Bayesian prior and the collected data), b) for each non-leading variation, calculating the percent that the credible interval for the leading variation of the template overlaps the credible interval for the non-leading variation (that is, intervals that have been defined above may overlap. That is, if one interval is (0, 10) and the second interval is (5, 15), then the percent overlap would be 50%), and c) determining if all these percentages are less than a predetermined percentage (such as, 10%), and the interval criterion is met. For an embodiment, step 830 is a necessary step to compute the precision threshold.

For an embodiment, assigning a respective group of the electronic message recipients to the first template of the electronic message and the second template of the electronic message, wherein the assigning is random, includes applying an adaptive method to set an allocation of recipients to templates that are performing better, randomly assigning the recipients to the first template and the second template based on the allocation, and sending the first template or the second template to the recipients as randomly assigned.

At least some embodiments further include integrating information received from the testing with electronic marketing information. For an embodiment, the electronic marketing information includes one or more of electronic message recipient actions, discount offers, and product purchases. For an embodiment, integrating information received from the testing with electronic marketing information comprises using electronic marketing information to qualify the electronic message recipients for the testing includes ensuring that recipients in the testing have all taken actions pertaining to other marketing actions. For an embodiment, integrating information received from the testing with electronic marketing information comprises dynamically updating content in the templates based on actions or characteristics of the user within the electronic marketing information. For an embodiment, integrating information received from the testing with electronic marketing information includes at least some of the test information determined during testing of the templates being used for influencing marketing information.

Figure 13:
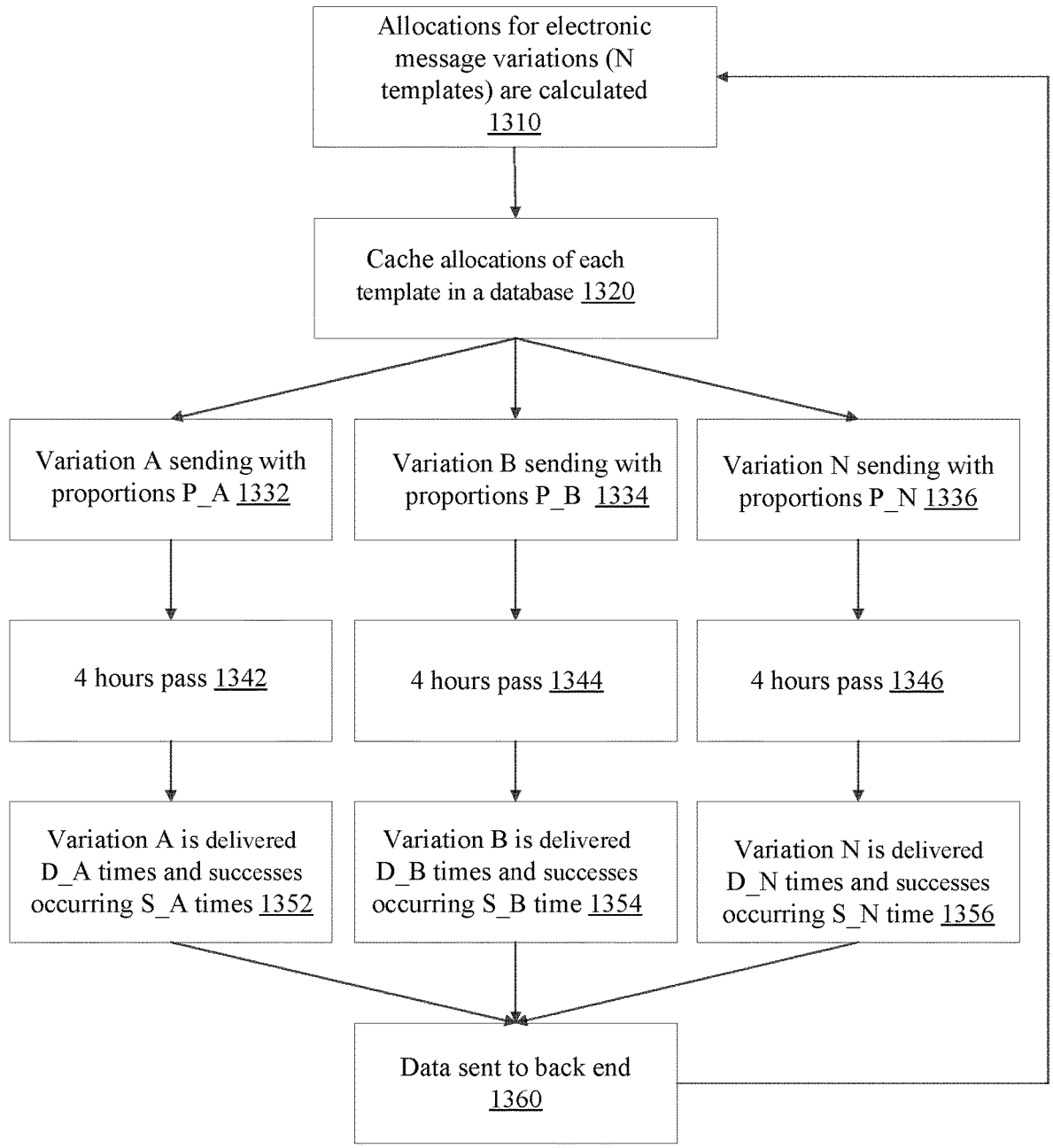
FIG. 13 is a flow chart that includes steps of a method of testing variations of templates, according to an embodiment.

FIG. 13 is a flow chart that includes steps of a method of testing variations of templates, according to an embodiment. A first step 1310 includes calculating allocations for electronic message variations (N templates). For an embodiment, this includes assigning, by the server, a respective group of recipients to the first template of the electronic message and the second template of the electronic message, wherein the assigning is random. A second step 1320 includes caching the allocations of each template in a database. Third steps 1332, 1334, 1336 include variation A sending with proportions P_A, variation B sent with proportions P_B, and variation N sent with proportions P_N. Fourth steps 1342, 1344, 1346 include each of the variations A, B, N being utilized for a predetermined period of time, such as, 4 hours. Fifth steps 1352, 1354, 1356 provides the test results, and include electronic messages of each of the templates A, B, N being delivered D_A, D_B, D_N times, and successes of each electronic template occurring S_A, S_B, S_N times. The test data can then be sent 1360 back to the backend server (for an embodiment, the backend server is the portion of the server 101 that a merchant does not directly interact with, but that stores and computes data). For an embodiment, after completion of step 1360, a wait period (for example, a 4 hour wait) is performed, then step 1310 is performed, and steps 1310-1360 are cycled through many times in the course of a test before the test ends.

Figure 14:
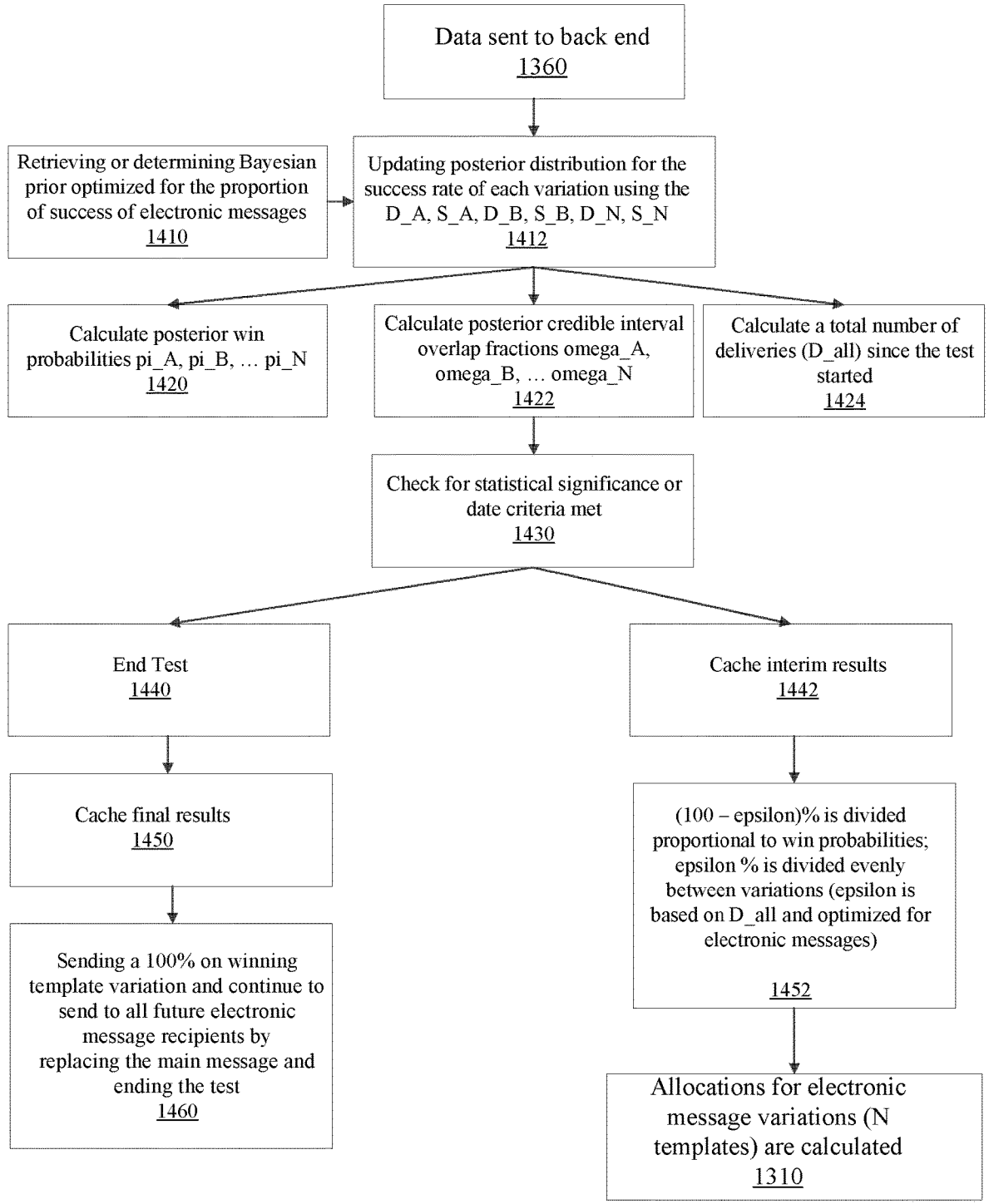
FIG. 14 is a flow chart that includes steps of a method of determining statistical significance of the different templates, according to an embodiment.

FIG. 14 is a flow chart that includes steps of a method of determining statistical significance of the different templates, according to an embodiment. For an embodiment, the method of this flow chart receives the test data sent 1360 back to the backend server of the flow chart of FIG. 13. A set of first steps includes 1410 retrieving or determining, for example, Bayesian prior optimized for the proportion of successes electronic messages experience, 1412 updating posterior distribution for the success rate of each variation using the D_A, S_A, D_B, S_B, D_N, S_N generated by the steps of FIG. 13. A set of second steps includes 1420 calculating posterior win probabilities pi_A, pi_B, pi_N, 1422 calculating posterior credible interval overlap fractions omega_A, omega_B, omega_N, and 1424 calculating a total number of deliveries (D_all) since the test started. A third step 1430 includes checking whether a statistical significance or date criteria has been met. For an embodiment, the data criteria include specifying that a pre-specified time has passed. For example, the date criteria may include "end the test before Black Friday".

For an embodiment, the flow chart of FIG. 14 is an implementation of step 1010 of FIG. 10 for an adaptive method to set the allocation of electronic message recipients to each template in the test. For an embodiment, the flow chart of FIG. 14 receives the test data, which for an embodiment includes D_A, D_B, . . . D_N, and the number of deliveries or attempted deliveries (sends). For an embodiment, which of the number of deliveries or attempted deliveries that is included is dependent on which is used as the denominator for determining the success rate (for this particular test). That is, the success rate can be determined by either the number of successes divided by the number of attempted deliveries or by the number of successes divided by the number of deliveries. For an embodiment, which of these is used for determining the success rate is known or set when the test starts, and then does not change during the test.

For an embodiment, the test data is received for each of the templates since the test started, and S_A. S_B, . . . S_N, the number of successes for each template since the test started. For an embodiment, the test data is sent to the portion of the server 101 that is responsible for computing values and storing data, but that is kept at a level of separation from the network 114.

For an embodiment, the test data is used in conjunction with 1410 Bayesian priors that are optimized to perform with test data in ranges that are typical for the proportion of successes that onsite electronic messages experience. For an embodiment, the test data and the Bayesian priors are used at 1412 to update the posterior distribution for the success rate for each template, which represents the current belief in which values the success rate is likely to take after accounting for random chance, prior belief, and the test data collected so far.

For an embodiment, the set of steps 1420, 1422, 1424 are carried out in parallel, or simultaneously. For an embodiment, the collection of updated posterior distributions computed in 1412 are used 1420 to compute posterior win probabilities pi_A, pi_B, . . . pi_N for each template, which represent the probability that the template A. B, . . . N has the highest success rate of all the templates. The collection of updated posterior distributions computed in 1612 are also used to generate posterior credible intervals, which represent the highest-likelihood values that the success rate for each template is likely to take, after accounting for random chance, prior belief, and the data collected in the test. For an embodiment, the leading template's posterior credible interval is compared 1422 to the other templates' posterior credible intervals; the overlap fraction omega_A, omega_B, . . . omega_N is calculated as the percent of the width of the smaller interval that also lies inside the other interval. For example, two non-overlapping intervals would have an interval overlap fraction of 0%, while the intervals [0.05, 0.15] and [0.10, 0.20] would have an interval overlap fraction of 50%. Finally, for an embodiment, the test data is used 1424 to determine the minimum number of attempted deliveries or deliveries among all the templates in the test.

For an embodiment, the values calculated in 1420, 1422, and 1424 are used 1430 to determine whether a statistical significance criterion has been met. For an embodiment, this includes checking three separate criteria, all of which must be met for statistical significance to be declared. For an embodiment, the win probability for the currently leading variation must be above an adaptive threshold; this is analogous to the win probability threshold 850. The largest of the interval overlap fractions 1422 must be smaller than an adaptive threshold; this is analogous to the precision threshold 840. The minimum number of deliveries across all templates 1424 must be above an adaptive threshold; this is analogous to the volume threshold 820. If all these criteria are met, then statistical significance is achieved, and the test is determined to be ready to stop. Additionally, even if statistical significance is not met, 1430 includes checking if a date criterion has been satisfied. A date criterion is satisfied if an adaptive date threshold has passed—for instance, if the merchant server 140 specifies that a test must end by 2021 Nov. 26. If the date criterion is met, then regardless of statistical significance, the test is determined to be ready to stop.

For an embodiment, if the test was determined to be ready to stop in 1430, it ends 1440. The final results are cached 1450 so that the final results can be sent to the server 101 at a time that is convenient for the server's activity. The winning template will send 1460 to electronic message recipients with a 100% allocation.

For an embodiment, step 1460 includes test data. For an embodiment, the test data includes the D_A, S_A, D_B, S_B, D_N, S_N. Step 1460 includes sending 100% on the winning template variation and continuing to send to all future electronic message recipients by replacing the main message and ending the test.

For an embodiment, if the test was determined not to be ready to stop in 1630, then the testing continues. Interim results are cached 1442 so that the interim results can be sent to the server 101. The updated data are used to compute 1452 the new allocations that each template should send to recipients. In this embodiment, that process takes the electronic message of dividing multiplying (100—epsilon) % by the posterior win probabilities for each template 1020, then dividing the remaining epsilon % evenly across all variations. For an embodiment, epsilon is an adaptive parameter that depends on the test data. For an embodiment, the allocations for each template are now computed 1310, and as described in FIG. 8, and the allocations are used to control the proportion of the time that each electronic message actually sends to an eligible recipient.

Although specific embodiments have been described and illustrated, the embodiments are not to be limited to the specific electronic messages or arrangements of parts so described and illustrated. The described embodiments are to only be limited by the claims.

What is claimed:

1. A computer-implemented method for testing templates of electronic messages, comprising:
   continuously electronically sending, by a server, a main electronic message, wherein at least a content of the main electronic message is determined by a main message template;
   creating a plurality of test templates including at least an A template and a B template;
   initiating, by the server, testing of test electronic messages, wherein at least a content of one test electronic message is determined by the A template, and at least the content of another of the test electronic message is determined by the B template;
   wherein editing of the test electronic messages occurs simultaneous with the continuous sending of the main electronic message;
   sensing, by sensors of computing devices of recipients of the test electronic messages, actions of the recipients in response to receiving the test electronic messages;
   selecting, by the server, a winning template of the A template and the B template based on at least the sensed actions of the recipients of the test electronic messages;
   replacing, by the server, the main message template with the winner of the A template or the B template causing a dynamic update of an image displayed to the recipients based on an electronic message of the winner of the A template or the B template displayed on the computing devices of the recipients, wherein the electronic message includes a link for selection by the recipients; and
   displaying, by the server, results of a series of completed testing of messages according to templates grouped with a live test to a merchant, thereby allowing the merchant to make decisions based on the completed tests and the live test.

2. The method of claim 1, further comprising:
switching, by the server, between the sending of the main message and the sending of the test messages, wherein no customer of the merchant receives both the main message and any one of the test messages and all customers receive at least one of the main message or one of the test messages.

3. The method of claim 1, further comprising:
transitioning from editing at least the A template and the B template, to testing the test electronic messages according to the A template and the B template, wherein the transition is initiated by the merchant.

4. The method of claim 3, wherein sending of the main electronic message ceases during the testing.

5. The method of claim 1, further comprising the merchant editing at least one of the main message template, the A template, or the B template during the continuous sending of the main electronic message.

6. The method of claim 1, further comprising coordinating the sending of the main electronic message, editing of the A template and the B template, testing of messages according to the A template and the B template, and selecting a winning template over time.

7. The method of claim 1, wherein continuously sending the main electronic message comprises triggering the sending of the main electronic message based on at least one of a customer being added to a list of customers, a customer being added to a dynamically generated group of customers based on an arbitrary set of criteria (segment), a dynamically ingested webhook event associated with the merchant, an action that a customer has taken that the server has just associated with the customer, a date associated with the customer or the merchant.

8. The method of claim 1, further comprising the merchant selecting a weighting between the A template and the B template, wherein the weighting sets allocations of test messages being sent to customers according to each of the A template and the B template.

9. The method of claim 1, further comprising the server adaptively selecting a weighting between the A template and the B template, wherein the weighting sets allocations of customers to each of the A template and the B template.

10. The method of claim 9, wherein the server adaptively selects the weighting based on at least which test electronic message is winning the testing of the A template and the B template.

11. The method of claim 1, wherein the A template and the B template are continuously tested.

12. The method of claim 11, further comprising continuously displaying results of the testing of the A template and the B template, wherein a weighting of each of the template and the B template is continuously updated.

13. The method of claim 12, wherein displaying the results comprises displaying results of the testing in real-time for templates A and B.

14. The method of claim 1, wherein displaying the results comprises:
displaying real-time results for data associated with past testing, current testing, past main messages, or a live main electronic message.

15. The method of claim 1, wherein the testing ends when one template is determined to have statistical advantage over another template, comprising;
collecting test data from testing including deliveries of the test electronic messages and interactions with test electronic message of the A template and the test electronic message of the B template;
generating estimates of a success rates for the A template and the B template including applying an analysis method to the collected test data to determine a win probability difference between a win probability for the A template and a win probability for the B template, and determine that the win probability difference is greater than a selected win threshold;
determining that a precision of the estimates of the success rate is greater than a precision threshold;
determining that greater than a volume threshold of test data has been collected;
determining, by the server, the statistical advantage when the selected win threshold, the precision threshold, and the volume threshold are all met.

16. The method of claim 1, wherein the testing ends as selected by the merchant.

17. The method of claim 1, further comprising:
selecting a winning template of a first testing of electronic messages;
initiating a second testing of electronic messages, wherein at least a content of one test electronic message is determined by the winning template of the first testing, and at least the content of another of the test electronic message is determined by a C template; and
selecting, by the server, a second winning template of the winning template of the first testing and the C template.

18. A system for testing templates of electronic messages, comprising:
a merchant server configured to operate and manage a website;
a plurality of customer devices configured to receive electronic messages; and
a server electronically connected to the merchant server and the plurality of customer devices, the server configured to:
continuously send a main electronic message, wherein at least a content of the main electronic message is determined by a main message template;
create a plurality of test templates including at least an A template and a B template;
initiate testing of test electronic messages, wherein at least a content of one test electronic message is determined by the A template, and at least the content of another of the test electronic message is determined by the B template;
wherein editing of the test electronic messages occurs simultaneous with the continuous sending of the main electronic message;
wherein sensors of computing devices of recipients of the test electronic messages sense actions of the recipients in response to receiving the test electronic messages;
wherein the server is further configured to:
select a winning template of the A template and the B template based on at least the sensed actions of the recipients of the test electronic messages; and
replace the main message template with the winner of the A template or the B template causing a dynamic update of an image displayed to the recipients based on an electronic message of the winner of the A template or the B template displayed on the computing devices of the recipients, wherein the electronic message includes a link for selection by the recipients; and
display results of a series of completed testing of messages according to templates grouped with a live test to a merchant, thereby allowing the merchant to make decisions based on the completed tests and the live test.

\* \* \* \* \*